UNITED STATES PATENT OFFICE.

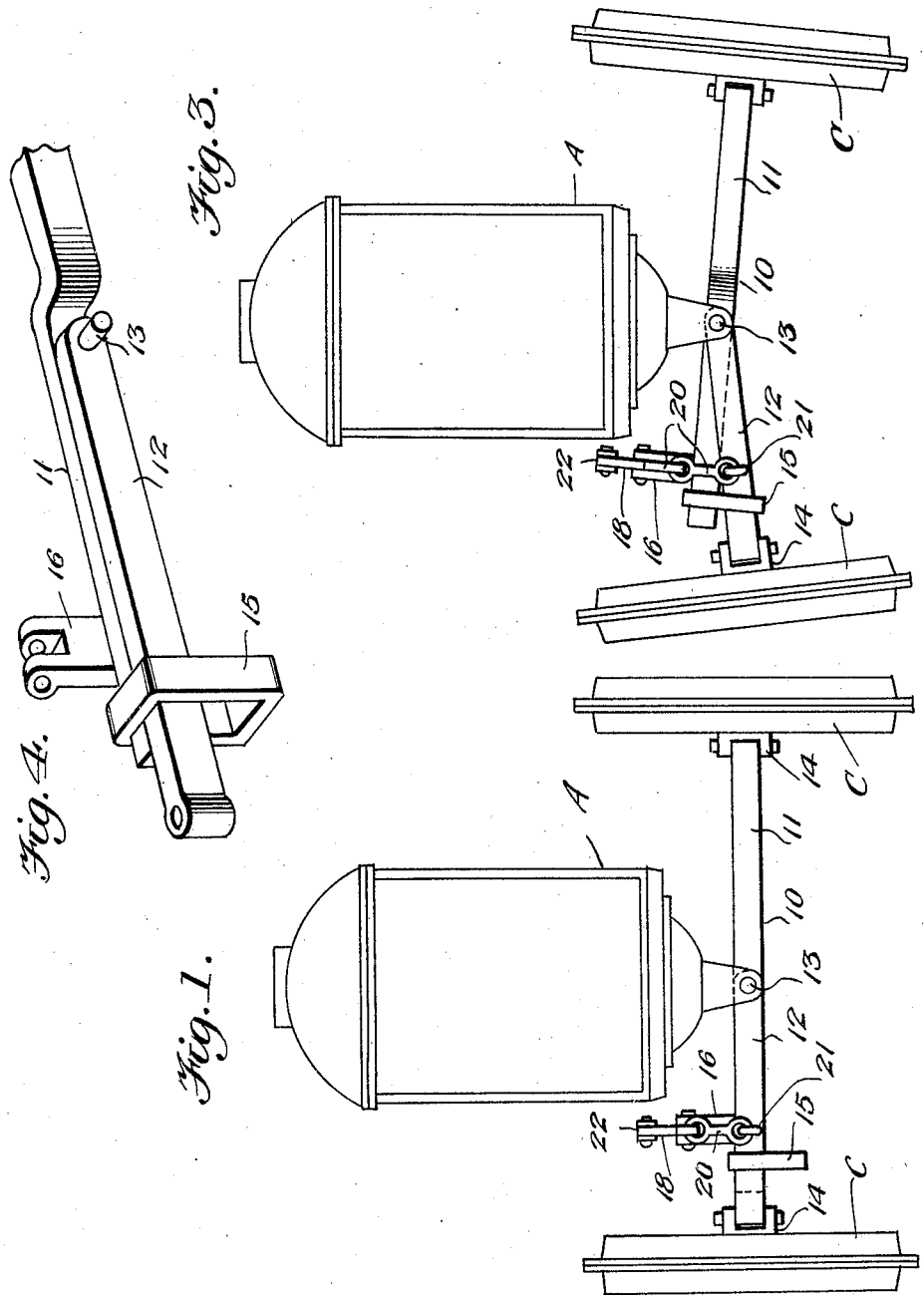

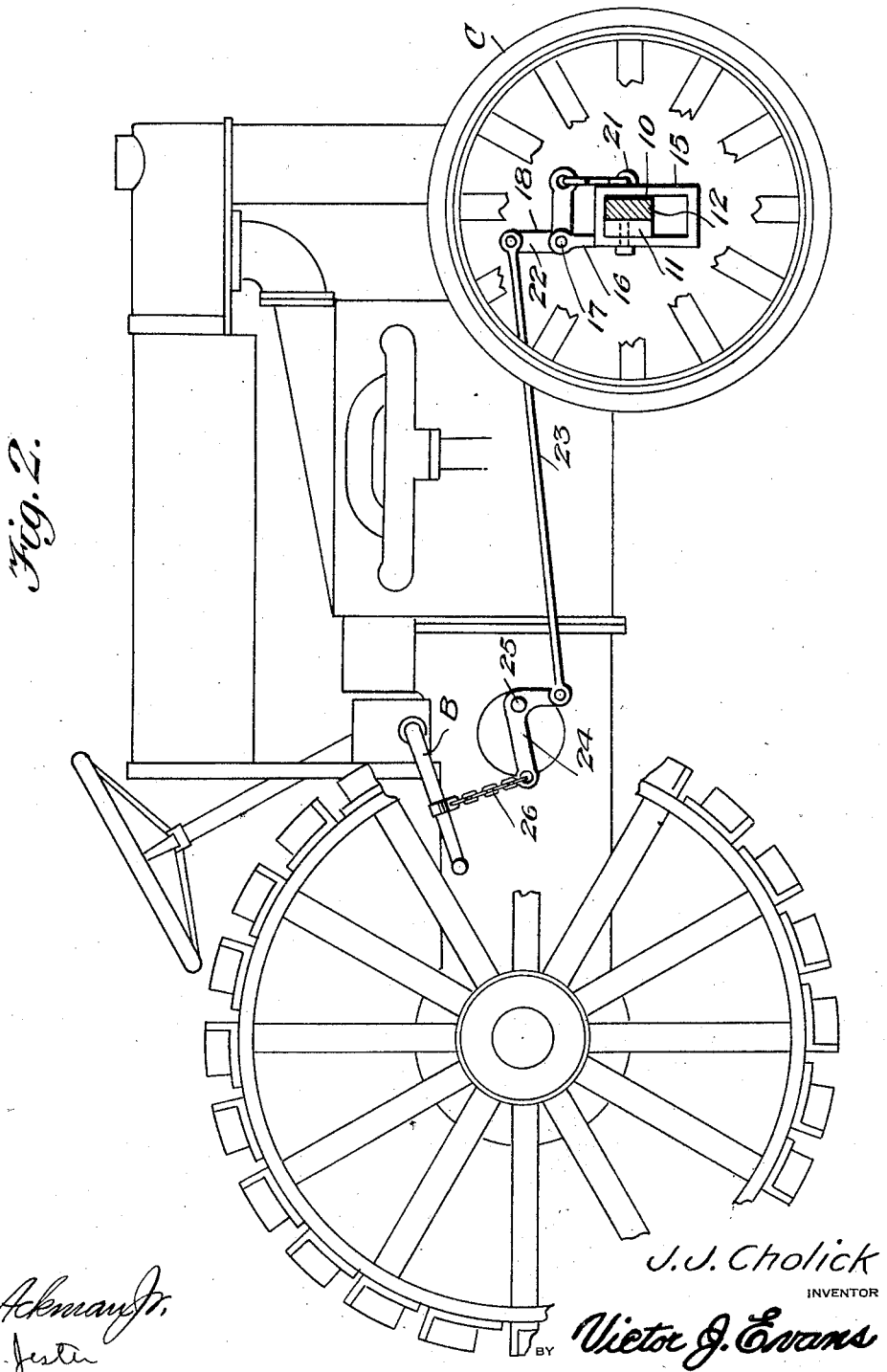

JOSEPH JOHN CHOLICK, OF RIO HONDE, TEXAS.

ATTACHMENT FOR TRACTORS.

1,389,488.  Specification of Letters Patent.  Patented Aug. 30, 1921.

Application filed May 24, 1920. Serial No. 383,982.

*To all whom it may concern:*

Be it known that I, JOSEPH J. CHOLICK, a citizen of the United States, residing at Rio Honde, in the county of Cameron and State of Texas, have invented new and useful Improvements in Attachments for Tractors, of which the following is a specification.

This invention relates to tractors and has for its object the provision of means whereby when the front axle and wheels of the tractor rise caused by rearing of the tractor, the clutch will be automatically disconnected and remain so until the front wheels of the tractor descend again into engagement with the ground.

An important and more specific object is the provision in a tractor of a front axle formed in sections pivotally connected, one section being connected by suitable means with the clutch mechanism and the wheels serving as weights whereby when the tractor rears back and the front wheels leave the ground the axle sections will move relatively and exert a pull upon the means connected with the clutch whereby the clutch will be thrown out.

An additional object is the provision of a device of this character which will be simple and inexpensive in manufacture and installation, highly efficient in use, durable in service, and a general improvement in the art.

With the above and other objects and advantages in view the invention consists in the details of construction to be hereinafter more fully described and claimed, and illustrated in the accompanying drawings in which—

Figure 1 is a front elevation of a tractor having my device associated therewith, Fig. 2 is a side elevation with parts broken away and omitted to show the connecting means between the axle and the clutch mechanism, Fig. 3 is a view similar to Fig. 1 showing the position assumed by the parts when the front wheels leave the ground, and Fig. 4 is a detail perspective view of one of the axle sections.

Referring more particularly to the drawings, the letter A designates a tractor generally, and B designates the clutch control lever.

In carrying out my invention I provide a front axle structure designated broadly by the numeral 10 and this axle is formed of two sections 11 and 12, the latter being pivotally connected at one end with the intermediate portion of the former, as shown at 13. At their outer ends the sections 11 and 12 carry the usual steering knuckles 14 from which extend the spindles carrying the wheels C. Secured upon the section 11 at the inner end thereof is a yoke 15 which is rectangular in shape and through which extends the section 12. When the front wheels C are resting upon the ground it will be observed that the weight of the tractor will hold the axle sections 11 and 12 in the same horizontal plane with the sections arranged side by side and with the section 12 engaging the top of the opening in the yoke 15. It will be seen that in the event of the tractor rearing back, resulting in the front wheels leaving the ground, the axle sections 11 and 12 will swing relatively to each other upon the pivot 13, the wheels serving as weights for accomplishing this movement. This movement is limited by the engagement of the section 12 with the lower edge of the opening in the yoke 15. In order to make use of this movement for throwing out the clutch, I provide a bracket 16 which is secured upon the section 11 adjacent the yoke 15 and upon this bracket is pivoted, as shown at 17, an angle lever 18 which has one arm 19 connected by a link 20 with an eye 21 on the section 12. Connected with the other arm 22 of the angle lever is a link 23 which is in turn connected with one end of a swivel lever 24 pivoted upon some suitable portion of the tractor frame, as shown at 25. The other arm of this lever is connected by a link 26 with the clutch lever of the tractor.

In the operation of the device it will be seen that when the tractor rears up and the sections of the front axle move relatively, as above described, a pull will be exerted upon the link 20 which will result in rocking the angle lever 18 forwardly which will cause a pull upon the link 23, resulting in swinging of the swivel lever 24. The movement of the swivel lever will result in pulling the clutch lever B into its disengaged position. When the front wheels of the tractor again contact with the ground and the axle sections return to normal position, the movement of the angle lever 18 and the various links will be the reverse whereupon the clutch lever will be returned to its engaged position. It will be noted that the action is entirely automatic.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with the clutch lever of a tractor, lever means connected therewith and with the front axle whereby upon backward rearing of the tractor the clutch lever will be moved to disengaged position, the front axle being formed of pivotally connected sections, and said lever means being connected with and moved by movement of the sections.

2. In combination with a tractor, a front axle formed of relatively movable sections normally retained immovable when the front wheels of the tractor are upon the ground, said sections moving relatively when the tractor rears backwardly and the front wheels leave the ground, and means connected with said sections and with the clutch control lever whereby to move the lever to disengaged position when the tractor rears, said lever being returned to normal position when the front wheels descend into engagement with the ground.

3. In combination with a tractor and the clutch control lever thereof, a front axle formed of sections pivotally connected at the central portion of the axle, the outer ends of said sections carrying the front wheels, a yoke rigidly secured to one section and through which the other section extends whereby to hold the sections in the same horizontal plane when the front wheels are upon the ground and to limit the relative movement of the sections when the front wheels leave the ground when the tractor rears, a bracket rigidly secured to said first named section, and an angle lever pivoted upon said bracket and having one arm connected with said second named axle section and its other arm connected with said clutch lever.

In testimony whereof I affix my signature.

JOE JOHN CHOLICK.